US007762378B2

(12) United States Patent
Möri et al.

(10) Patent No.: US 7,762,378 B2
(45) Date of Patent: Jul. 27, 2010

(54) ELEVATOR INSTALLATION WITH COMPENSATING-MEANS GUIDE

(75) Inventors: Peter Möri, Rothenburg (CH); Franz Weingartner, Ebikon (CH); Karsten Gensicke, Buchrain (CH)

(73) Assignee: Inventio AG, Hergiswil NW (CH)

( * ) Notice: Subject to any disclaimer, the term of this patent is extended or adjusted under 35 U.S.C. 154(b) by 861 days.

(21) Appl. No.: 11/081,242

(22) Filed: Mar. 16, 2005

(65) Prior Publication Data

US 2005/0217940 A1 Oct. 6, 2005

(30) Foreign Application Priority Data

Mar. 17, 2004 (EP) .................................. 04006290

(51) Int. Cl.

*B66B 7/00* (2006.01)
*B66B 7/06* (2006.01)
*F16H 57/00* (2006.01)
*F16N 7/16* (2006.01)

(52) U.S. Cl. ......................... 187/414; 187/404; 184/21; 474/92

(58) Field of Classification Search ................. 187/404, 187/407, 414; 184/21; 474/92; 198/496; 15/88.1, 268, 256.6, 398; *B66B 7/06, 7/12*
See application file for complete search history.

(56) References Cited

U.S. PATENT DOCUMENTS

| | | | | | |
|---|---|---|---|---|---|
| H702 | H * | 11/1989 | Shively et al. | | 187/405 |
| 5,386,882 | A * | 2/1995 | Friend | | 184/15.3 |
| 5,746,302 | A * | 5/1998 | Bowman | | 198/496 |
| 5,784,752 | A * | 7/1998 | Barrett et al. | | 15/256.6 |
| 6,098,755 | A * | 8/2000 | Wyssmann | | 184/22 |
| 6,488,125 | B1 | 12/2002 | Otsuka et al. | | |

FOREIGN PATENT DOCUMENTS

| | | | |
|---|---|---|---|
| GB | 293802 | | 6/1929 |
| JP | 07061735 | | 3/1995 |
| JP | 07061735 | A * | 3/1995 |
| JP | 2000034073 | | 2/2000 |

OTHER PUBLICATIONS

English translation of JP-07061735 A.*

* cited by examiner

*Primary Examiner*—John Q Nguyen
*Assistant Examiner*—Stefan Kruer
(74) *Attorney, Agent, or Firm*—Fraser Clemens Martin & Miller LLC; William J. Clemens

(57) ABSTRACT

An elevator installation with an elevator car and a counterweight, a suspension cable suspending the elevator car and the counterweight, and a compensating cable compensating the effect of the weight of the suspension cable, is equipped with a compensating cable guide which for the purpose of guiding the compensating cable has at least one brush.

11 Claims, 2 Drawing Sheets

Fig. 3 (Detail A)
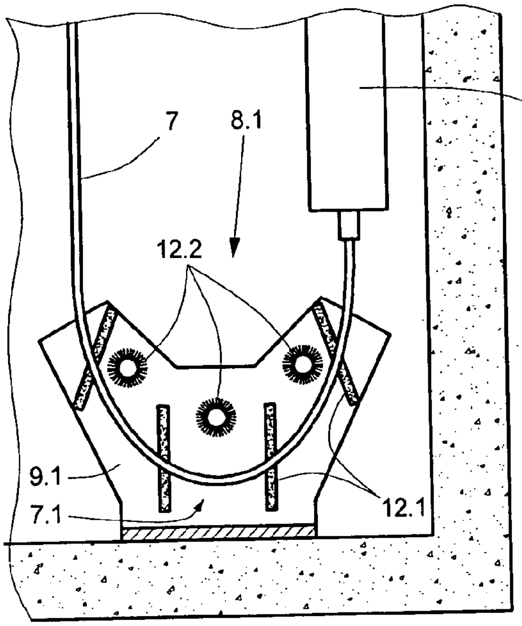
Fig. 3A
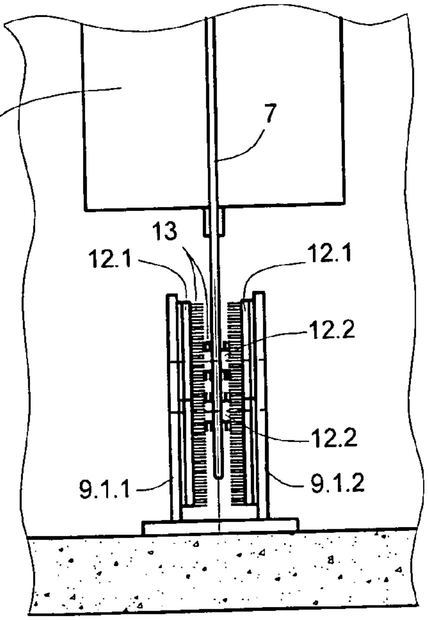
Fig. 4 (Detail B)
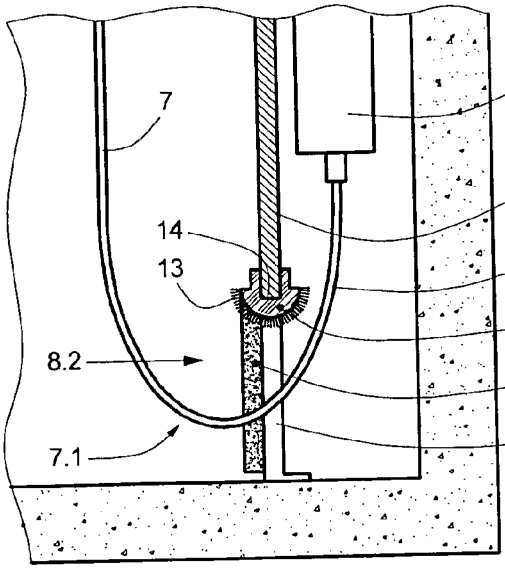
Fig. 4A
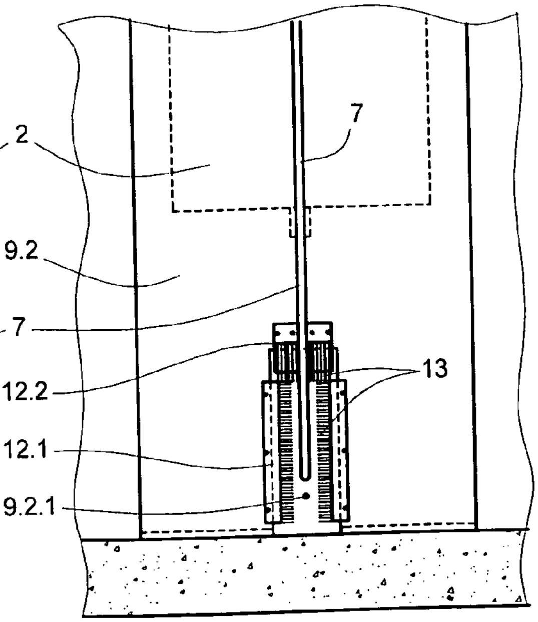

ELEVATOR INSTALLATION WITH COMPENSATING-MEANS GUIDE

BACKGROUND OF THE INVENTION

The present invention is an elevator installation with a compensating-means guide.

In association with elevator installations, the term "compensating means" is to be understood as a flexible means in the form of a rope, belt, or chain, which is hung at each of its two ends from the elevator car and the counterweight respectively and forms a hanging loop of compensating means. The purpose of the compensating means is to compensate the effect, on the driving force needed on the traction sheave, of the weight of the suspension and driving means (suspension ropes, suspension belts), which depends on the position of the car in the elevator shaft.

U.S. Pat. No. 6,488,125 shows an elevator installation with a compensating-means guide in which the rope-shaped compensating-means form a loop of compensating-means which in the area of its reversal is guided by a plurality of guide pulleys arranged in a frame.

The compensating-means guide as disclosed in the U.S. Pat. No. 6,488,125 has certain disadvantages. When built in, it occupies a relatively large amount of space which in certain elevator installations is not available. Should there be metallic contact between the compensating means and the guide pulleys, noise is produced. The rigidly supported pulleys cannot damp oscillations occurring in the compensating means.

SUMMARY OF THE INVENTION

A purpose of the present invention is to create a device of the type described above which does not possess the stated disadvantages, which particularly requires less space when built in, generates less noise, and effectively damps oscillations of the compensating means.

The present invention is based on the idea of guiding the compensating means hanging from the elevator car and counterweight in a hoistway with the aid of brushes.

By "brush" is meant an object which comprises a body—the brush-body—which has been formed in some manner and in which bristles, i.e. slender bars of small cross section, are fastened individually or in tufts.

An "elevator hoistway" is to be understood essentially as a space used by the car and the counterweight as an area in which to travel, hoistway walls not necessarily being present.

According to a preferred embodiment of the present invention, the compensating means is equipped with more than one brush. The hanging compensating means can thereby by guided at several points and/or in various directions.

A further development of the present invention which fulfills the purpose particularly well consists of the compensating-means guide having a number of brushes which are arranged in such manner that in the area of reversal of the compensating means they limit the deflections of the compensating means perpendicular to the direction of reversal, and/or in the direction of reversal of the compensating means, and/or in the vertical direction.

Depending on the type of compensating means and its weight per meter of length, brushes with different bristles are used. Bristle diameters of 0.3 mm to 2 mm and free bristle lengths of 5 mm to 10 mm have proved suitable.

In fulfillment of the purpose, a further embodiment of the present invention consists of there being permanently installed in the hoistway space, usually in the area of the lower end of the hoistway or on the floor of a hoistway pit, a brush carrier. This brush carrier can be present, for example, in the form of a section-frame or a plate-frame and is so constructed that the brushes can be fastened to it in a suitable position and direction.

It is advantageous for at least some of the brushes to be constructed as bar-shaped brushes, which are also known as strip brushes or lath brushes. In such brushes the bristles are preferably arranged on the narrow side of an oblong prismatic brush-body with essentially flat rectangular cross section.

In a particular embodiment of the present invention, at least one of the brushes is constructed as a so-called cylinder brush. In this, bristles are inserted into a cylindrical brush-body in radial direction. A cylinder brush is particularly suitable as guide for the compensating-means in a concave zone of its reversal. The cylinder brush can also be present as only a part of a complete cylinder, for example in the form of a half-cylinder.

According to a further embodiment of the invention, the compensating-means guide can contain a cylinder brush which is held rotatably—for example in combination with rolling-contact bearings—in the brush carrier. Such an embodiment is especially suitable for avoiding grinding noises at points where relatively high guiding forces are required.

According to yet a further development which fulfills the purpose particularly well, the brush bodies have a groove or step which serves to, or assists in, fastening the brush-body in the area of an edge of a plate-shaped part of the brush carrier.

To fasten the brush-body onto the brush carrier, additional aids such as screws, clips, straps, cable ties, etc. are used.

It is advantageous for the brush bodies of the brushes to be connected with the brush carrier in such manner that the brushes can be moved in the direction of their bristles, i.e. toward the compensating means or away from it. Suitable for such a solution are, for example, screw fasteners in combination with oblong holes in the brush-body, or connectors with spring clips.

It is preferable for brushes to be used whose bristles consist of plastics, preferably of polyamide or polypropylene. However, natural bristles can also be used, for example horsehair bristles or hog's bristles.

By careful selection of the bristle material, the bristle diameter, and the bristle length, the resistance to wear, production of noise, and damping properties of the compensating-means guide can be optimized. A damping property is to be understood as the property of the brush to prevent or attenuate oscillations of the compensating means within or outside the guidance area.

An embodiment of the present invention which fulfills the purpose particularly well consists of the brush carrier being formed by a plate-like or sheet-like separating wall which separates the space occupied by the counterweight in the lowest area of the hoistway from the rest of the hoistway space. Such a separating wall is required by elevator codes to prevent a maintenance person present in the lowest area of the hoistway (in the hoistway pit) from being injured by the downward traveling counterweight. In the case of an elevator with a compensating means which, as described above, is hung in the form of a compensating-means loop between the elevator car and the counterweight, and which has a reversal in the lowest area of the hoistway, this reversal is situated in the area of the separating wall. The compensating means must therefore be passed through an opening in the separating wall. In this case it is advantageous for the separating wall in the area of the opening to be used as a brush carrier for brushes which guide the compensating means in the area of its reversal.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 3 is an enlarged view of the area "A" of FIG. 1 showing details of the compensating-means guide;

FIG. 3A is a fragmentary side elevation view of the compensating-means guide shown in FIG. 3;

FIG. 4 is an enlarged view of the area "B" of FIG. 2 showing details of the compensating-means guide integrated in the separating wall; and FIG. 4A is a fragmentary side elevation view of the compensating-means guide shown in FIG. 4 viewed in the direction of the flat side of the aforementioned separating wall.

DESCRIPTION OF THE PREFERRED EMBODIMENT

Figure 1:
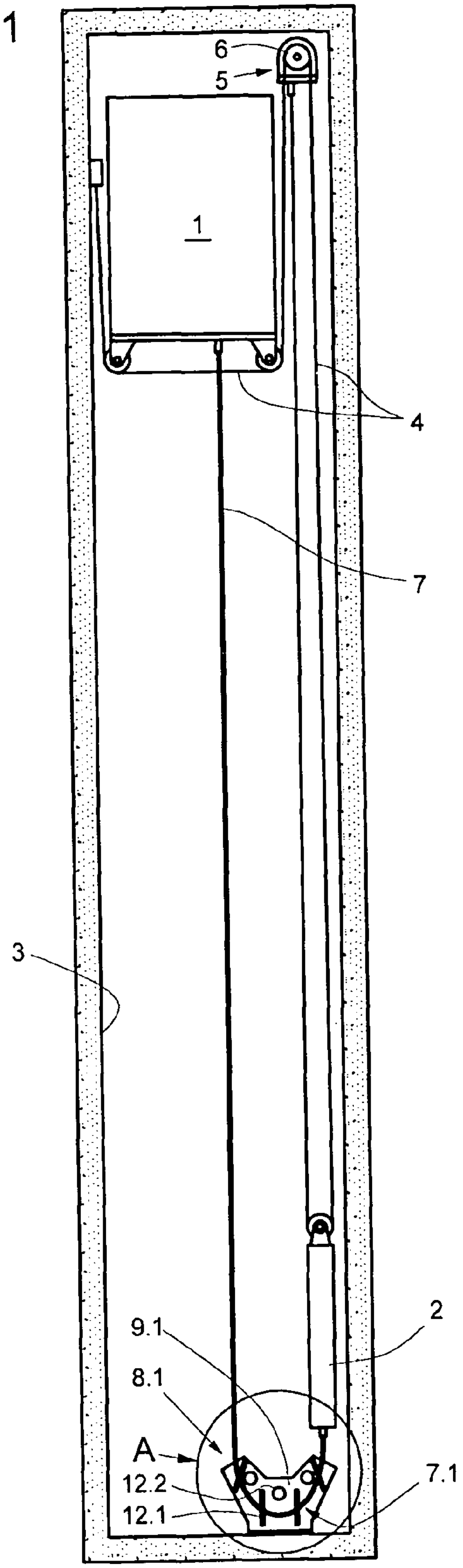
FIG. 1 is a schematic cross-section through an elevator installation with a compensating means and a compensating-means guide with brushes according to the present invention.
Figure 2:
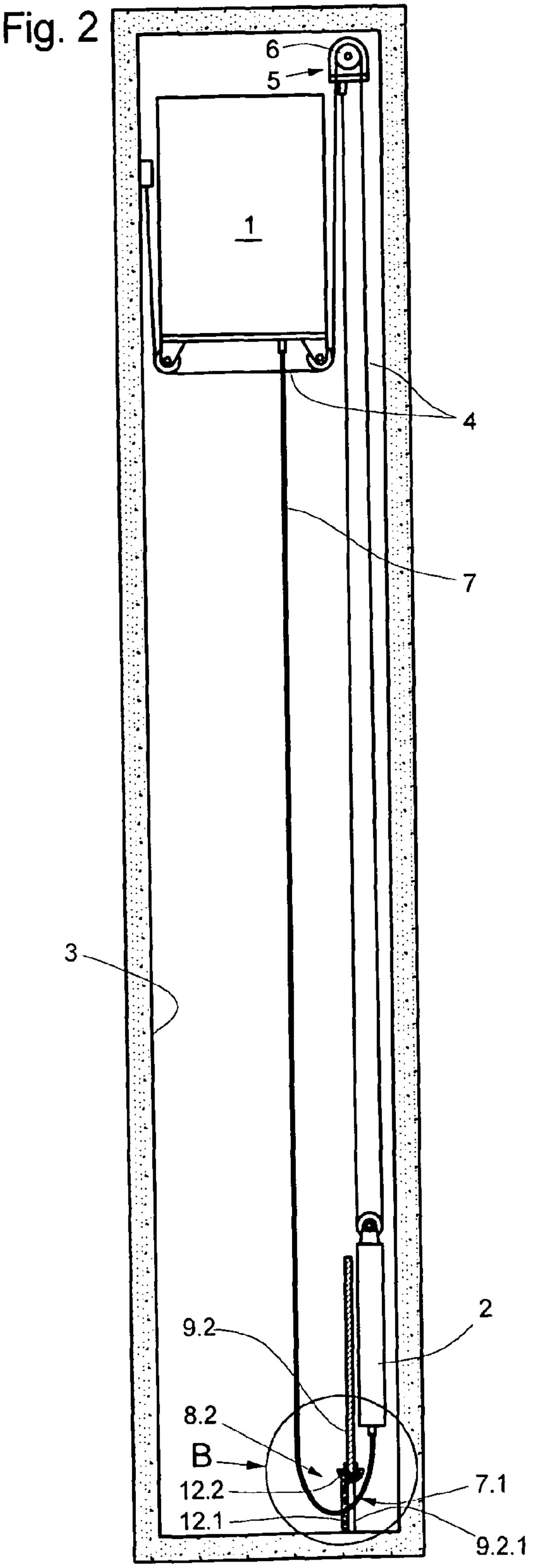
FIG. 2 is a schematic cross-section through an elevator installation with a compensating means, a separating wall present in the lowest area of the hoistway between the counterweight space and the remaining hoistway space, and a compensating-means guide with brushes according to the present invention integrated into the separating wall.

FIGS. 1 and 2 each show an elevator installation according to the present invention. Shown in both drawings are an elevator car 1 and a counterweight 2 which are installed in an elevator hoistway 3. The elevator car 1 and the counterweight 2 hang on a suspension means 4 via which they are moved vertically by a drive unit 5 having a traction sheave 6 along guide rails which are not shown. Hanging between the elevator car 1 and the counterweight 2 respectively is a compensating means 7 in the form of a loop which is fastened by one of its ends to the elevator car 1 and fastened by an opposite end to the counterweight 2.

Visible in FIGS. 1 and 2 are two variants of a compensating-means guide 8.1, 8.2. In each case, these have a number of brushes 12.1, 12.2 which guide the compensating means 7 in the area of its reversal 7.1 perpendicular to the direction of reversal, in the direction of reversal, and also in the vertical direction, i.e. restrict the possible deflection of the compensating means 7 from its intended position.

The compensating-means guide 8.1 visible in FIG. 1 comprises a brush frame 9.1 which is fastened in the hoistway or on the floor of the hoistway and fulfills the function of a brush carrier. The compensating-means guide 8.1 is shown enlarged as Detail "A" in FIG. 3 and described in more detail further below by reference to FIGS. 3 and 3A.

FIG. 2 shows an elevator installation in which the hoistway space occupied by the counterweight 2 in the lower area of the hoistway is separated from the hoistway space occupied by the elevator car 1 by a permanently installed separating wall 9.2. To allow the compensating means 7, which is fastened at one end to the counterweight 2 and at the other end to the elevator car 1, to pass from one of the hoistway spaces through to the other, the separating wall 9.2 has above the floor of the elevator hoistway a pass-through opening 9.2.1. The separating wall 9.2, i.e. in particular the part of it in the area of the so-called pass-through opening 9.2.1, is used as carrier for the brushes 12.1, 12.2 in the variant of the compensating-means guide 8.2 shown in FIG. 2. The compensating-means guide 8.2 is shown enlarged as Detail "B" in FIG. 4, and described further below by reference to FIGS. 4 and 4A.

In FIG. 3 the circled part of the drawing marked in FIG. 1 with "A" is shown enlarged so as to make the details of the compensating-means guide 8.1 visible, which comprise the brush frame 9.1 fastened as brush carrier to, for example, the floor of the hoistway. FIG. 3A is a side view of the compensating-means guide shown in FIG. 3. The compensating means 7, which can be constructed as, for example, a wire rope, as an open round-link chain, or as a round-link chain encased in plastic, or as a flat-belt type belt with integral materials of high density, hangs in the area of its reversal 7.1 between bar-shaped brushes 12.1 which are fastened on side parts 9.1.1, 9.1.2 of the brush frame 9.1 and hereinafter are referred to as bar brushes 12.1. These bar brushes 12.1 with their bristles 13 directed toward the compensating means 7 provide guidance of the compensating means 7 perpendicular to its direction of reversal. The length of the bar brushes 12.1 is designed so that changes in the vertical position of reversal 7.1 of the compensating means 7 of an amount depending on the height of the elevator are permissible.

Referenced with 12.2 are cylinder brushes which extend from one side-part 9.1.1 of the brush frame 9.1 to the oppositely positioned side-part 9.1.2 and, by means of their radially directed bristles 13, limit and damp any oscillations of the compensating means 7 which may occur. Where high guiding forces are needed and/or grinding noises should be suppressed, the cylinder brushes can also be arranged rotatably about their longitudinal axis and fitted with rolling-contact bearings for this purpose.

Non-rotating cylinder brushes 12.2 need not be formed as complete cylinders, i.e. they can also fulfill their function with a half-cylindrical form as shown in FIG. 4.

In FIG. 4 the circled section of drawing marked with "B" in FIG. 2 is shown enlarged so as to make visible the details of the variant of a compensating-means guide 8.2 shown in FIG. 2. In this compensating-means guide 8.2, the brush carrier is formed by a plate-like or sheet-like separating wall 9.2 which in the lowest area of the hoistway separates the hoistway space occupied by the counterweight from the hoistway space occupied by the elevator car. FIG. 4A is a side view of the compensating-means guide shown in FIG. 4 viewed in the direction of the flat side of the said separating wall 9.2. This separating wall 9.2 has in its lower area, i.e. in the area in which the reversal 7.1 of the compensating means 7 hanging on the elevator car 1 and on the counterweight 2 is situated, the pass-through opening 9.2.1. In the area of both side-edges of this pass-through opening 9.2.1, vertically arranged bar brushes 12.1 are fastened to the separating wall 9.2, the bristles 13 of the bar brushes 12.1 being directed toward the compensating means 7 hanging between the side-edges. By means of these bar brushes 12.1, as well as guidance being provided of the compensating means 7 perpendicular to the direction of its reversal 7.1, deflections and oscillations of the compensating means 7 in this direction are also prevented or damped.

Attached to an upper edge 14 of the pass-through opening 9.2.1 is a cylinder brush 12.2 which forms a half-cylinder and whose bristles 13 are directed toward the concave part of the reversal 7.1 of the compensating means 7. The cylinder brush 12.2 has the function of guiding the compensating means 7 around the upper edge 14 of the pass-through opening 9.2.1 in the separating wall 9.2, any oscillations and jumps of the compensating means occurring in the vertical direction being thereby reduced and damped. The cylinder brush 12.2 could also be rotatable about its longitudinal axis and supported on the separating wall 9.2.

The brushes 12.1, 12.2 shown in FIGS. 3, 3A, 4, and 4A consist essentially of at least one bar-shaped or cylinder brush-body and the bristles 13 of differing length and thickness fixed therein. The brushes with their brush bodies are fastened by means of screws, clips, straps, cable ties, etc. to the brush carrier (brush frame 9.1, separating wall 9.2). To improve the connection between the brush-body and the brush carrier, they can have in their brush bodies slits which—as shown in the cylinder brushes in FIG. 4A—allow the brush-body to be snapped onto an edge of the brush carrier. The brush-body can, for example, be fastened by means of screws which pass through elongated holes, or by means of elastic clips, by means of which brushes can be moved toward or away from the compensating means 7 so as to be able to set optimal distances between brush and compensating means 7 and to compensate for bristle wear.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A guide apparatus for guiding a compensating means in an elevator installation having an elevator car and a counterweight suspended in a hoistway space by a suspension means running over a sheave arranged in an upper area of the elevator installation, and a compensating means hung at its two respective ends from the elevator car and the counterweight to form a hanging loop, comprising:

a compensating-means guide adapted to be positioned in an area of a reversal of the compensating means, wherein said compensating-means guide has a plurality of brushes for contacting and guiding said reversal of said compensating means, said brushes when arranged in the area of reversal of the compensating means limit deflections of the compensating means to at least one of perpendicular to a direction of the reversal of the compensating means, a direction of the reversal of the compensating means, and a vertical direction, wherein said brushes are fastened to a brush carrier which is adapted to be permanently installed in the hoistway space, wherein at least one of said brushes has a brush-body movably mounted to said brush carrier to permit adjustment of a distance from the compensating means, and wherein said brush carrier is formed as a separating wall which in a lowest area of the hoistway space separates a space occupied by the counterweight from the rest of the hoistway space.

2. The guide apparatus according to claim 1 wherein said brushes have a plurality of bristles with at least one of diameters in a range of approximately 0.15 mm to 2 mm and free lengths in a range of approximately 5 mm to 100 mm.

3. The guide apparatus according to claim 1 wherein said brushes have a plurality of bristles formed of one of polyamide material, polypropylene material, horsehair and hog's bristles.

4. An elevator installation comprising:

an elevator car;

a counterweight;

a suspension means run over at least one sheave arranged in an upper area of the elevator installation and which suspends said elevator car and said counterweight in a hoistway space;

a compensating means which is hung at its two respective ends from said elevator car and said counterweight to form a hanging loop; and a compensating-means guide positioned in an area of a reversal of said compensating means, wherein said compensating-means guide has a plurality of brushes contacting and guiding said reversal of said compensating means, wherein said brushes are fastened to a brush carrier which is permanently installed in the hoistway space, and wherein said brush carrier is formed by a separating wall which in the lowest area of the hoistway separates a space occupied by said counterweight from the rest of the hoistway space.

5. The elevator installation according to claim 4 wherein said brushes are arranged in the area of reversal of said compensating means to limit deflections of said compensating means to at least one of perpendicular to a direction of the reversal of said compensating means, a direction of the reversal of said compensating means, and a vertical direction.

6. The elevator installation according to claim 4 wherein said brushes have a plurality of bristles with diameters in a range of approximately 0.15 mm to 2 mm.

7. The elevator installation according to claim 4 wherein said brushes have a plurality of bristles with free lengths in a range of approximately 5 mm to 100 mm.

8. The elevator installation according to claim 4 wherein at least one of said brushes has a brush-body movably mounted to said brush carrier to permit adjustment of a distance from said compensating means.

9. The elevator installation according to claim 4 wherein at least one of said brushes is a bar brush.

10. The elevator installation according to claim 4 wherein at least one of said brushes is at least part of a cylinder brush.

11. The elevator installation according to claim 4 wherein said brushes have a plurality of bristles formed of one of polyamide material, polypropylene material, horsehair and hog's bristles.

* * * * *